3,544,514
**PROCESS FOR THE PRODUCTION OF THERMO-
PLASTIC POLYCARBONATES**
Hermann Schnell, Krefeld-Urdingen, Ludwig Bottenbruch, Krefeld-Bockum, Kurt Weirauch, Krefeld, and Wilhelm Hechelhammer, Hugo Streib, and Gerhard Fritz, Krefeld-Bockum, Germany, assignors to Farbenfabriken Bayer Aktiengesellschaft, Leverkusen, Germany, a corporation of Germany
No Drawing. Continuation-in-part of application Ser. No. 520,653, Jan. 14, 1966. This application June 7, 1967, Ser. No. 644,106
Claims priority, application Germany, Jan. 15, 1965, F 44,973; June 8, 1966, F 49,420
Int. Cl. C08g 17/13
U.S. Cl. 260—47                       11 Claims

ABSTRACT OF THE DISCLOSURE

Branched chain high molecular weight thermoplastic polycarbonates containing the residues of monohydric phenols and polyhydric phenols having more than two hydroxy groups in the molecule.

---

The present invention relates to polycarbonates and more particularly to a process for the production of soluble high molecular weight, thermoplastic polycarbonates and is a continuation-in-part of copending application Ser. No. 520,653, filed Jan. 14, 1966, now abandoned.

Various types of polycarbonate resins are known, among which are those prepared by vinyl polymerization of unsaturated carbonate esters, such as allyl carbonates, etc., from the ester interchange of carbonate esters with glycols, and by the reaction of dihydroxy-monoaryl compounds such as hydroquinone and resorcinol with phosgene, carbonate esters or other carbonate precursors. In addition, it has been known that soluble high molecular weight linear thermoplastic polycarbonates can be obtained from the reaction of bisphenols with polycarbonate-forming derivatives of carbonic acid under polycarbonate forming reaction conditions, e.g., according to the processes of German patent specifications Nos. 971,-790, 971,777, 959,497, 1,007,996, 1,031,512, 1,046,311, 1,047,430 and 1,317,030.

Therein, monohydric phenols have also been used as chain terminators in an attempt to inhibit the considerable variation of average molecular weight from batch to batch.

It is an object of this invention to provide novel polycarbonates having especially favorable properties and a method for making them.

Another object of this invention is to provide polycarbonates which have a certain degree of branching but which are substantially free of cross-linking.

Still another object of this invention is to provide polycarbonates the melts of which having increased form stability at elevated temperatures when extruded.

A further object of this invention is to provide a process for preparing branched polycarbonates which are substantially free of cross-linking and the melts of which have increased form stability at elevated temperatures when extruded.

A still further object of this invention is to provide a process for preparing branched chain polycarbonates which are suitable for forming molded articles, preferably by the extrusion process.

The foregoing objects and others which will become apparent from the following description are accomplished in accordance with this invention, generally speaking, by providing branched chain high molecular weight thermoplastic polycarbonates containing in addition to residues of dihydroxy compounds the residues of monohydric phenols and polyhydric phenols having more than two hydroxy groups in the molecule.

According to the present invention, branched chain high molecular weight polycarbonates substantially free of cross-linking are obtained by reacting dihydroxy compounds with carbonic acid derivatives in the presence of about 0.01 to about 2.0 mol percent of an organic poly (hydroxyphenyl) compound having more than two hydroxy groups in the molecule, and of about 0.1 to about 8 mol percent of monohydric phenols, the mol percentages being based on the mols of the organic dihydroxy compounds. The organic poly(hydroxyphenyl) compounds are referred to hereinafter as polyhydric phenols.

Surprisingly, we have found that the thermoplastic polycarbonates thus obtained are completely soluble in the usual solvents and have relative viscosities of between about 1.20 and 1.55 when measured in solutions containing 0.5 gram of polycarbonate in 100 milliliters of methylene chloride at 25° C. In addition, the polycarbonates have an average molecular weight of between about 30,000 and about 100,000 when measured by means of light diffraction and have a melt viscosity of between 20,000 and about 300,000 poises when measured at 280° C. In addition, the melts exhibit an increased form stability to heat when extruded, while the extruded products show substantially no deterioration in their properties.

Any suitable polyhydric phenols having more than two hydroxy groups in the molecule may be used in this process such as, for example, phloroglucinol, 4,6-dimethyl-2,4,6 - tri - (4 - hydroxyphenyl)heptene - 2, (trimeric isopropenyl-phenol, obtainable, for example, by the process outlined in German patent specification No. 1,112,-980; M.P. 227–228° C.), 4,6-dimethyl-2,4,6-tri-(4-hydroxyphenyl)heptane (hydrogenated trimeric isopropenyl-phenol, obtainable by the hydrogenation of trimeric isopropenyl-phenol at 120–140° C. and 200 atmospheres hydrogen pressure in the presence of hydrogenation catalysts; M.P. 199–200° C.) 1,3,5-tri-(4-hydroxyphenyl)-benzene, 1,1,1-tri-(4-hydroxyphenyl)ethane, 2,2-bis-[4,4'-(dihydroxy - diphenyl) - cyclohexyl] - propane 2,4-bis(4-hydroxy - 1 - isopropylidine) - phenol, 2 - (4 - hydroxyphenyl) - 2 - [4,4 - bis - (4 - hydroxyphenyl) - cyclohexyl]-propane and the like as well as the reaction products of any suitable alkyl-, aryl- or halogen-substituted monophenols with formaldehyde or any suitable formaldehyde-yielding compounds. However, p-substituted monophenols are preferred. A representative example of this latter group of substances is the trisphenol obtained from p-cresol and formaldehyde, 2,6-bis-(2'-hydroxy-5'-methylbenzyl)-4-methyl phenol; further examples include 2,6-bis - (2' - hydroxy - 5' - isopropyl - benzyl) - 4 - isopropyl phenol, bis - [2 - hydroxy - 3 - (2' - hydroxy - 5' - methylbenzyl) - 5 - methylphenyl] - methane, 2,6 - bis - (2'-hydroxy - 5' - methylbenzyl) - 4 - chloro- or bromo-phenol and 2,6 - bis - (2' - hydroxy - 5' - chlorobenzyl)-4-methylphenol and the like.

Further examples of suitable products are described, for instance, in Houben-Weyl, Methoden d. org. Chemie 1963, pp. 193 ff.

Furthermore, condensation products of phenols is described in the U.S. Pat. 2,885,385.

Polyphenols of the type

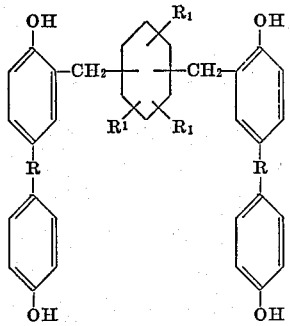

wherein:

R is a divalent aliphatic, araliphatic or cycloaliphatic hydroxyl radical or the oxygen or sulphur atom or a sulphone group or a single bond, and $R_1$ is hydrogen, an alkyl group having 1 to 8 carbon atoms or a cycloaliphatic hydrocarbon radical having 5 to 10 carbon atoms, as described in the German Pat. 1,092,026.

Polyphenols of the type

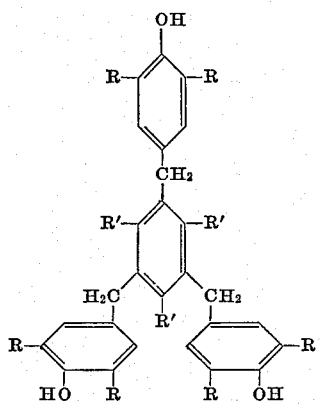

as described in the British specification No. 920,476.

Hence, any suitable alkyl-, aryl- or halogen-substituted monophenols with which the formaldehyde or formaldehyde-yielding compound may react can be used. Some such phenols include, for example, p-cersol, p-ethyl phenol, p-propyl phenol, p-isopropyl phenol, p-n-butyl-, and p-iso butyl phenol, p-tertiary butyl phenol, p-nonyl-phenol, p-isoamyl phenol, 4,5-dimethyl phenol, 3-decyl-4-methyl phenol, p-cyclohexyl phenol, p-cyclodecyl phenol, 4-methyl-5-ethyl phenol, p-phenyl-phenol, p-phenylisopropyl phenol, o- and p-chloro-bromo- and methyl-phenol.

The polyhydric phenols may be composed of three or more molecules of the same kind or different kinds of monophenols and mixtures thereof and the like.

Further, any suitable formaldehyde-yielding compound may be used instead of or in addition to formaldehyde. Some such compounds include, for example, trioxane, methylal and hexamethylene tetramine and mixtures thereof and the like.

Any suitable monohydric phenols may be used to prepare the polycarbonate of this invention. Some such suitable compounds include, for example, phenol, lower alkyl phenols such as, for example, 4-methylphenol, 3-ethylphenol, 5-propylphenol, 4-isopropylphenol, 5-butylphenol, 3-isobutylphenol, 4-tertiary butylphenol, 4-pentylphenol and the like; aryl phenols such as, for example, 4-phenyl phenol, 5-phenyl phenol and the like; cycloaliphatic phenols such as, for example, 4-cyclohexyl phenol, 3-cyclopentyl phenol and the like; monophenol alkanes such as, for example, 2,2-(4-hydroxyphenyl - 4 - methoxyphenyl) propane, 3-hydroxyphenyl ethane, as well as any of those referred to hereinbefore or hereinafter.

Further, the monohydric phenols may contain any suitable substituents which are inert with respect to the rest of the reactants as well as the polycarbonate product formed. Some such substituents include, for example, alkoxy groups such as, for example, methoxy, ethoxy, propoxy, butoxy, pentoxy and the like; halogen groups such as, for example, chlorine, bromine, iodine and the like; and any of the hereinbefore described phenols may contain any of the foregoing substituents in any of the free positions on the aryl or alkyl groupings thereof. Examples of some such suitable substituted monohydric phenols include p-methoxy-phenol, p-ethoxy phenol, p-chloro-phenol, 2,6-dichloro-phenol and the like.

High molecular weight thermoplastic polycarbonates may be produced from any suitable dihydroxy compounds including aliphatic, cycloaliphatic and aromatic dihydroxy compounds. Some such suitable aromatic dihydroxy compounds include, for example, the dimonohydroxy arylene alkanes and the dimonohydroxy arylene sulphones such as, for example, 4,4'-dihydroxydiphenylene sulphone,
2,2-dihydroxydiphenylene sulphone,
3,3'-dihydroxydiphenylene sulphone,
4,4'-dihydroxy-2,2'-dimethyldiphenylene sulphone,
4,4'-dihydroxy-3,3'-dimethyl-diphenylene sulphone,
2,2'-dihydroxy-4,4'-dimethyldiphenylene sulphone,
4,4'-dihydroxy-2,2'-diethyldiphenylene sulphone,
4,4'-dihydroxy-3,3'-diethyldiphenylene sulphone,
4,4'-dihydroxy-2,2'-di-tert.-butyl-diphenylene sulphone,
4,4'-dihydroxy-3,3'-di-tert.-butyl-diphenylene sulphone and
2,2'-dihydroxy-1,1'-dinaphthylene sulphone,
4,4'-dihydroxy-diphenylene-methane,
1,1-(4,4'-dihydroxy-diphenylene)-ethane,
1,1-(4,4'-dihydroxy-diphenylene)-propane,
1,1-(4,4'-dihydroxy-diphenylene)-butane,
1,1-(4,4'-dihydroxy-diphenylene)-2-methyl-propane,
1,1-(4,4'-dihydroxy-diphenylene)-heptane,
1,1-(4,4'-dihydroxy-diphenylene)-1-phenyl-methane,
(4,4'-dihydroxy-diphenylene)-(4-methyl-phenylene)-methane,
(4,4'-dihydroxy-diphenylene)-(4-ethyl-phenylene)-methane,
(4,4'-dihydroxy-diphenylene)-(4-isopropyl-phenylene)-methane,
(4,4'-dihydroxy-diphenylene)-(4-butyl-phenylene)-methane,
(4,4'-dihydroxy-diphenylene)-benzyl-methane,
(4,4'-dihydroxy-diphenylene)-alpha-furyl-methane,
2,2-(4,4'-dihydroxy-diphenylene)-propane,
2,2-(4,4'-dihydroxy-diphenylene)-butane,
2,2-(4,4'-dihydroxy-diphenylene)-pentane,
2,2-(4,4'-dihydroxy-diphenylene)-4-methyl-pentane,
2,2-(4,4'-dihydroxy-diphenylene)-heptane,
2,2-(4,4'-dihydroxy-diphenylene)-octane,
2,2-(4,4'-dihydroxy-diphenylene)-nonane,
1,1-(4,4'-dihydroxy-diphenylene)-1-phenyl-ethane,
(4,4'-dihydroxy-diphenylene)-1-(alpha-furyl)-ethane,
3,3-(4,4'-dihydroxy-diphenylene)-pentane,
4,4'-(4,4'-dihydroxy-diphenylene)-heptane,
1,1-(4,4'-dihydroxy-diphenylene)-cyclopentane,
1,1-(4,4'-dihydroxy-diphenylene)-cyclohexane,
2,2-(4,4'-dihydroxy-diphenylene)-decahydronaphthalene,
2,2-(4,4'-dihydroxy-3,3'-dicyclohexyl-diphenylene)-propane,
2,2'-(4,4'-dihydroxy-3-methyl-diphenylene)-propane,
2,2-(4,4'-dihydroxy-3-isopropyl-diphenylene)-butane,
1,1-(4,4'-dihydroxy-3,3'-dimethyl-diphenylene)-cyclohexane,
2,2-(4,4'-dihydroxy-3,3'-dibutyl-diphenylene)-propane,
2,2-(4,4'-dihydroxy-3,3'-diphenyl-diphenylene)-propane,
2,2-(4,4'-dihydroxy-2,2'-dimethyl-diphenylene)-propane,
1,1-(4,4'-dihydroxy-3,3'-dimethyl-6,6'-ditert.-butyl-diphenylene)-ethane, 1,1-(4,4'-dihydroxy-3,3'-dimethyl-6,6'-ditert.-butyl-diphenylene)-propane,
1,1-(4,4'-dihydroxy-3,3'-dimethyl-6,6'-ditert.-butyl-diphenylene)-butane,
1,1-(4,4'-dihydroxy-3,3'-dimethyl-6,6'-ditert.-butyl-diphenylene)-isobutane,
1,1-(4,4'-dihydroxy-3,3'-dimethyl-6,6'-ditert.-butyl-diphenylene)-heptane,
1,1-(4,4'-dihydroxy-3,3'-dimethyl-6,6'-ditert.-butyl-diphenylene)-1-phenyl-methane,
1,1-(4,4'-dihydroxy-3,3'-dimethyl-6,6'-ditert.-butyl-diphenylene)-2-methyl-2-pentane,
1,1-(4,4'-dihydroxy-3,3'-dimethyl-6,6'-ditert.-butyl-diphenylene)-2-ethyl-2-hexane,
1,1(4,4'-dihydroxy-3,3'-dimethyl-6,6'-ditert.-amyl-diphenylene)-butane, the corresponding bis-hydroxyphenyl ethers, sulphides sulphoxides and the like.

Among the great number of suitable di-monohydroxy arylene alkanes which may be used are the 4,4'-dihydroxy-diphenylene alkanes and it is preferred that of this class of compounds 2,2-(4,4'-dihydroxy-diphenylene)-propane and 1,1-(4,4'-dihydroxy - diphenylene) - cyclohexane be used.

Any suitable aliphatic dihydroxy compounds may be used including, for example, ethylene glycol, diethylene glycol, triethylene glycol, polyethylene glycol, thiodiglycol, ethylene dithiodiglycol, the di- and poly-glycols produced from propylene oxide-1,2, o, m or p-xylyene glycol, propanediol-1,3, butanediol-1,3, butanediol-1,4, 2-methyl propanediol-1,3- pentanediol-1,5, 2-ethylpropanediol-1,3, hexanediol - 1,6, octanediol - 1,8, 1-ethylhexanediol-1,3, decanediol-1,10 and the like.

Any other suitable aromatic dihydroxy compounds may also be used. Some such suitable compounds include hydroquinone, resorcinol, pyrocatechol, 4,4'-dihydroxydiphenyl, 2,2'-dihydroxydiphenyl, 1,4 - dihydroxynaphthalene, 1,6 - dihydroxynaphthalene, 2,6-dihydroxynaphthalene, 1,2 - dihydroxynaphthalene, 1,5 - dihydroxynaphthalene, dihydroxy anthracene, 2,2' - dihydroxynaphthalene, 1,1'- and o, m, and p-hydroxybenzyl alcohol and the like.

Any suitable cycloaliphatic dihydroxy compounds may be used including cyclohexanediol - 1,4, cyclohexanediol-1,2, 2,2 - (4,4' - dihydroxy-dicyclohexylene) - propane, 2, 6 - dihydroxy decahydronaphthalene, the corresponding bis-alkoxylated aromatic dihydroxy compounds thereof and the like.

In addition, any of those components and conditions described in Canadian Pats. 578,585, 578,795, 594,805 and U.S. Pats. 3,028,365, 2,999,846, 2,970,131, 2,991,273, 2,999,835 and 3,014,891 may also be used.

In some cases mixtures of various dihydroxy compounds especially those having at least one aromatic and at least one aliphatic dihydroxy compound can be used thereby providing for mixed polycarbonates.

The formation of the high molecular weight polycarbonates by the reaction of di-(monohydroxyaryl-alkanes with derivatives of carbonic acid may be carried out by the conventional technique known in the art. For example phosgene can be introduced into a solution of di-(monohydroxyaryl)-alkanes in organic bases such as dimethylaniline, diethylaniline, trimethylamine and pyridine, or into solutions or di-(monohydroxyaryl)-alkanes in indifferent organic solvents such as benzene, ligroin, cyclohexane, methylcyclohexane, benzene, toluene, xylene, chloroform, methylenechloride, carbon tetrachloride, trichloro-ethylene, trichloroethane, methyl acetate and ethyl acetate with the addition of an acid binding agent.

A process particularly suitable for producing polycarbonates consists of introducing phosgene into an aqueous solution of alkali metal salts such as lithium, sodium, potassium and calcium salts of the di-(monohydroxyaryl)-alkanes, preferably in the presence of an excess of a base such as lithium, sodium, potassium and calcium hydroxide or carbonate. The polycarbonate precipitates out from the aqueous solution.

The conversion in the aqueous solution is promoted by the addition of indifferent solvents of the kind mentioned above which are capable of dissolving phosgene and eventually the produced polycarbonate.

It is also possible to react the di-(monohydroxyaryl)-alkanes with equal molecular amounts of bis-chlorocarbonic acid esters of di(monohydroxyaryl)-alkanes under corresponding conditions.

Also, the di-(monohydroxyaryl)-alkanes can be re-esterified with carbonic acid diesters, e.g. dimethyl, diethyl, dipropyl, dibutyl, diamyl, dioctyl, dicyclohexyl, diphenyl and di-, o-, p-tolyl carbonate at elevated temperatures from about 50° C. to about 320° C. and especially from about 120° C. to about 280° C.

When using phosgene or bis-chlorocarbonic acid esters as derivatives of the carbonic acid in producing polycarbohates, catalysts may also be advantageous. Such catalysts are, for example, tertiary or quaternary organic bases or salts thereof such as, trimethylamine, triethylamine, dimethylaniline, diethylaniline, dimethylcyclohexylamine, and pyridine, or for instance, the corresponding hydrochlorides and tetramethylammonium hydroxide, triethyloctadecyl ammonium chloride, trimethylbenzylammonium fluoride, triethylbenzylammonium chloride, dimethyldodecyl ammonium chloride, dimethylbenzylphenyl ammonium chloride, trimethylcyclohexyl ammonium bromide, and N-methyl-pyrodonium chloride in amounts of from about 0.002 to about 0.5% by weight. These compounds may be added to the reaction mixture before or during the reaction, The reaction of dihydroxy compounds such as di-(monohydroxyaryl)-alkanes with phosgene or the chlorocarbonic acid esters of di(monohydroxy)-alkanes in the presence of the polyhydric phenols and monohydric phenols may be carried out at room temperature or at lower or elevated temperatures, that is to say, at temperatures of from the freezing point up to about the boiling point of the mixture and preferably from about 0° C. to about 100° C. The reaction conditions should be such that about one mol of phosgene reacts with about one mol of the dihydroxy compounds.

By addition of from about 0.01 to about 2.0 and preferably from about 0.25 to about 1.5 mol percent of polyhydric phenols having more than two hydroxy groups in the molecule and from about 0.1 to about 8, and preferably from 1 to 6 mol percent of monohydric phenols based on the mols of dihydroxy compound, it is possible to produce thermoplastic polycarbonates which contain a certain degree of branching but which are substantially free of crosslinking. In addition, these polycarbonates have a relative viscosity ranging from about 1.20 to about 1.55, an average molecular weight of between 30,000 and about 100,000 and a melt viscosity of between 20,000 and about 300,000 poises.

In the formation of polycarbonates from either the solution polymerization reaction of the interfacial polycondensation reaction it is necessary to add both the polyhydric phenols and the monohydric phenols to the hydroxy compounds which are reacted with phosgene or bis-chlorocarbonic acid esters in order to obtain the desired polycarbonate product having the desired properties of this invention. However, in the transesterification reaction, i.e. in the case of the reaction of the bis-phenols with carbonic acid aryl esters in the melt, it is only necessary to add the polyhydric phenols in the above stated amounts and thus omit the addition of the monohydric phenols providing care is taken to prevent the monohydric phenol which is liberated by the reaction from the diaryl carbonate from being completely removed from the reaction mixture. As long as the monohydric phenol is present in the amount specified above, it will automatically participate in the synthesis of the polycarbonates.

Furthermore, in some of these cases, it is preferred to add surface active agents such as alkali metal salts of higher fatty acids or of sulphonic acids or of higher aliphatic or aromatic hydrocarbons and polyoxyethylated alcohols and phenols. Greater amounts of the quaternary ammonium bases mentioned above act as surface active agents.

Additives of all kinds can be added before, during or after the production of the polycarbonates. For example, additives such as dyestuffs, pigments, stabilizing agents against the effect of moisture, heat, ultra-violet radiation, lubricants, fillers such as glass powder, quartz products, graphite, molybdenum disulphide, metal powders, powders of high melting synthetic resins, e.g., polytetrachloroethylene powder, natural fibres such as cotton and asbestos, as well as glass fibers of the most varied types, metal fibers as well as fibers which are stable during residence in the melt of the polycarbonate and do not markedly damage the polycarbonate may be added to the polycarbonate composition.

The polycarbonates produced according to the present invention are elastic thermoplastic materials which are soluble in a variety of organic solvents which can be worked up from solutions into shaped articles such as films, fibers or the like or into lacquer coatings. A polycarbonate which is substantially free from decomposition at elevated temperatures such as is prepared by this invention, can be easily fabricated into useful articles, films, fibers, sheets, tubes, rods and the like from a melt or solution thereof by conventional shaping techniques such as molding, casting or extruding. Also, these polycarbonates can be used to make laminates such as safety glass, or to prepare protective or decorative coatings.

In order that those skilled in the art may better understand how the present invention may be practiced, the following examples are given by way of illustration and not by way of limitation. All parts are by weight unless otherwise specified, the relative viscosities being measured on solutions of 0.5 g. of the product in 100 ml. methylene chloride at 25° C. and the melt viscosities being measured at 280° C.

EXAMPLE 1

To a mixture of about 137.6 parts of 2,2-(4,4'-dihydroxydiphenyl)-propane, about 2.55 parts of p-tert.-butylphenol, about 0.605 parts of trimeric isopropenylphenol, about 112.5 parts of 45% sodium hydroxide solution, about 700 parts of distilled water and about 1336 parts of methylene chloride, are added over a period of about two hours at 20–25° C., with stirring in a nitrogen atmosphere, about 73 parts of phosgene, while adding simultaneously over a period of about 80 minutes an additional 48 parts of 45% sodium hydroxide solution dropwise. After the addition of phosgene is complete, about 0.24 part by weight triethylamine is added after which time the reaction mixture becomes more viscous. After about one hour, the reaction mixture is allowed to separate out; the organic phase, which contains the polycarbonate is separated off, and subsequently washed with 2% phosphoric acid, 2% sodium hydroxide solution, again twice with 2% phosphoric acid and, finally, 10 times with distilled water until the solution has a neutral reaction. After drying over anhydrous sodium sulphate, the methylene chloride solution can be worked up as follows:

(a) Via an evaporation extruder or simply by distilling off the solvent in a vacuum drying cabinet.

(b) By precipitation of the polymer with, for example, acetone, alcohol or aliphatic or cycloaliphatic hydrocarbons.

(c) By the addition of chlorobenzene and distilling off the methylene chloride. Upon cooling the chlorobenzene solution, it gels and can be further worked up in a granulating machine to a powdery-granular mixture. The products obtained are dried for 48 hours at 120° C. under water pump vacuum.

The relative viscosity of the product obtained by distilling off the solvent is 1.341.

EXAMPLE 2

Into a mixture of approximately 137.6 parts of 2,2-(4,4'-dihydroxy-diphenyl)-propane, about 2.55 parts of p-tert.-butylphenol, about 1.21 parts of trimeric isopropenylphenol, about 112.5 parts of 45% sodium hydroxide solution, about 700 parts of distilled water and about 1336 parts of methylene chloride, there are added over a period of about two hours at 20–25° C. and with stirring in an atmosphere of nitrogen, about 73 parts of phosgene while, at the same time, over a period of about 80 minutes an additional 48 parts of 45% sodium hydroxide solution are added dropwise.

After the phosgene addition is complete, about 0.24 part of triethylamine is added. The reaction mixture becomes viscous. After about one hour, the organic phase is separated off and the polycarbonate recovered by one of the methods described in Example 1. The relative viscosity of the product is 1.385.

EXAMPLE 3

Into a mixture of approxiamtely 137.6 parts of 2,2-(4,4'-dihydroxy-diphenyl)-propane, about 2.55 parts of p-tert.-butylphenol, about 1.694 parts of trimeric isopropenylphenol, about 112.5 parts of sodium hydroxide solution, about 700 parts of distilled water and about 1336 parts of methylene chloride, there are added over a period of about two hours at 38° C. and with stirring in an atmosphere of nitrogen, about 73 parts of phosgene while, at the same time, over a period of about 80 minutes an additional 48 parts of 45% sodium hydroxide solution are added dropwise. After the phosgene addition is complete, about 0.24 part by weight triethylamine is added. The reaction mixture becomes viscous. The polycarbonate product is recovered by one of the methods described in Example 1. The relative viscosity of the product is 1.431.

EXAMPLE 4

Into a mixture of about 137.6 parts of 2,2-(4,4'-dihydroxydiphenyl)-propane, about 2.55 parts of p-tert.-butylphenol, about 2.42 parts of trimeric isopropenylphenol, about 112.5 parts of 45% sodium hydroxide solution, about 700 parts of distilled water and about 1336 parts of methylene chloride, there are added over a period of about two hours at 20–25° C. with stirring and in an atmosphere of nitrogen, approximately 73 parts of phosgene while, at the same time, adding about 48 parts of 45% sodium hydroxide solution dropwise over a period of about 80 minutes. Upon completion of the phosgene addition, about 0.24 part of triethylamine is added. The reaction mixture becomes viscous. The product is worked up in accordance with the procedure described in Example 1. The relative viscosity of the product is 1,539.

EXAMPLE 5

Into a mixture of about 161.5 parts of 1,1-(4,4'-dihydroxydiphenyl)-cyclohexane, about 2.7 parts of p-tert.-butylphenol, about 2.42 parts of trimeric isopropenylphenol, about 164.5 parts of 45% sodium hydroxide solution, about 700 parts of distilled water and about 1336 parts of methylene chloride, there are added over a period of about two hours at 20–25° C. with stirring and in an atmosphere of nitrogen, about 73 parts of phosgene. Approximately 0.24 part of triethylamine is thereafter added. After about one hour, the reaction mixture is allowed to separate out and the organic phase, which contains the polycarbonate, separated off and worked up in accordance with the procedure described in Example 1. The relative viscosity of the product is 1.522.

EXAMPLE 6

Into a mixture of about 161.5 parts of 1,1-(4,4'-dihydroxydiphenyl)-cyclohexane, about 2.7 parts of p-tert.- butylphenol, about 1.22 parts of hydrogenated trimeric isopropenylphenol, about 164.5 parts of 45% sodium hydroxide solution, about 700 parts of distilled water and about 1336 parts of methylene chloride, there are added over a period of about two hours at 20–25° C. with stirring and in an atmosphere of nitrogen, about 73 parts of phosgene. Thereafter about 0.24 part of triethylamine is added. After about one hour, the reaction mixture is allowed to separate out and the organic phase, which contains the polycarbonate, is separated off and worked up in accordance with the method described in Example 1. The relative viscosity of the product is 1.321.

EXAMPLE 7

Into a mixture of about 161.5 parts of 1,1-(4,4'-dihydroxydiphenyl)-cyclohexane, about 2.7 parts of p-tert.-butylphenol, about 1.22 parts of trimeric isopropenylphenol, about 166 parts of 45% sodium hydroxide solution, about 700 parts of distilled water and about 1330 parts of chlorobenzene, there are added over a period of about two hours at 60° C. with stirring and in an atmosphere of nitrogen, about 73.5 parts of phosgene. Thereafter about 0.24 part of triethylamine is added. After one hour, the reaction mixture is allowed to separate out and the organic phase, which contains the polycarbonate, is separated off and worked up by the method described in Example 1. The relative viscosity of the product is 1.325.

EXAMPLE 8

Into a mixture of about 137.6 parts of 2,2-(4,4'-dihydroxydiphenyl)-propane, about 2.85 parts of p-tert.-butylphenol, about 1.067 parts of 1,3,5-tri-(4-hydroxyphenyl)-benzene, about 112.5 parts of 45% sodium hydroxide solution, about 700 parts of distilled water and about 1336 parts of methylene chloride, there are added over a period of about two hours at 20–25° C. with stirring and in an atmosphere of nitrogen, about 73 parts by weight phosgene while simultaneously adding dropwise for up to 80 minutes an additional 52 parts of 45% sodium hydroxide solution. Approximately 0.24 part of triethylamine is thereafter added. After about one hour, the reaction mixture is allowed to separate out, the organic phase is separated off and the polycarbonate isolated therefrom as described in Example 1. The relative viscosity of the product is 1.328.

EXAMPLE 9

Into a mixture of about 3440 parts of 2,2-(4,4'-dihydroxydiphenyl)-propane, about 82.5 parts of p-tert.-butylphenol, about 60.5 parts of trimeric isopropenylphenol, about 4113 parts of 45% sodium hydroxide solution, about 17,500 parts of distilled water and about 33,130 parts of methylene chloride, there are added at about 24–26° C. over a period of about two hours with stirring and in an atmosphere of nitrogen approximately 1825 parts of phosgene. Thereafter about 6 parts of triethylamine are added. After stirring for an additional hour, the organic phase is separated off, washed several times with 2% sodium hydroxide solution, 2% phosphoric acid and distilled water and finally worked up according to the process (c) of Example 1. The polycarbonate has a relative viscosity of 1.322, the melt viscosity is about 129,500 poises and the average molecular weight determined by means of light diffraction is about 56,700.

EXAMPLE 10

Into a mixture of about 3,440 parts of 2,2-(4,4'-dihydroxydiphenyl)-propane, about 71.25 parts of p-tert.-butylphenol, about 30.25 parts of trimeric isopropenylphenol, about 4,113 parts of 45% sodium hydroxide solution, about 17,500 parts of distilled water and about 33,130 parts of methylene chloride, there are added at about 24–25° C. over a period of about two hours with stirring and in an atmosphere of nitrogen, about 1825 parts of phosgene followed by the addition of about 6 parts triethylamine. The reaction mixture is stirred for an additional hour. The polymer is worked up to a granulate by means of an evaporation extruder. The relative viscosity of the product is about 1.322, the melt viscosity is about 59,370 poises and the average molecular weight, determined by means of light diffraction, is about 43,200.

EXAMPLE 11

Into a mixture of about 3,440 parts of 2,2-(4,4'-dihydroxydiphenyl)-propane about 60.0 parts of p-tert.-butylphenol, about 21.2 parts of trimeric isopropenylphenol, about 4,113 parts of 45% sodium hydroxide solution, about 17,500 parts of distilled water and about 33,130 parts of methylene chloride, there are added at about 24–25° C. over a period of about two hours with stirring and in an atmosphere of nitrogen, approximately 1825 parts phosgene. Approximately 6 parts of triethylamine are subsequently added thereto. The reaction mixture is stirred for an additional hour. The polymer is worked up to a granulate by means of an evaporation extruder. The relative viscosity is about 1.359 and the average molecular weight, determined by light diffraction, is about 47,000.

The polymers obtained according to Examples 10 and 11 are, after drying for 6 hours in a vacuum drying cupboard at 110° C., melted, homogenized and extruded to a thread in known manner by means of a worm press (heating zones: 290° C., 290° C., 290° C., 220° C.; 18 r.p.m.; current utilization 3.5 amps). The behavior of the thread thus obtained is investigated. The results are given in Table I wherein (a) and (b) represent the threads obtained from the instant process. For comparison, columns (c) and (d) illustrate two known polycarbonates which are synthesized only on the basis of bisphenol A. The polymer according to Example (c) was produced by transesterification and that according to Example (d) was produced in known manner by interfacial polycondensation process.

TABLE I

| | a | b | c | d |
|---|---|---|---|---|
| Relative viscosity of starting material (25° C. in methylene chloride; C=5 g./liter. | 1.323 | 1.359 | 1.325 | 1.360 |
| Extrusion of a 50 cm. long thread: | | | | |
| Time (seconds) | 62 | 86 | 48 | 29 |
| Weight (grams) | 58 | 75 | 45 | 30 |
| Tension corrosion (injection molded) standard flat rod, narrow: 4 x 10 x 120 mm., laid on 2 rotatable bushes as 90 mm. apart and stressed in the middle with 4,750 g. Dripped with an m-xylene/n-propanol mixture in weight ratio of 35:65 (sec.). | 109 | 474 | 78 | 155 |
| Bending strength (kp./cm.²) | 1,032 | 998 | 979 | 1,000 |
| Bending angle measured on injection molded test rods, degrees. | 88 | 87 | 88 | 87 |

It is to be recognized that the new polycarbonates described under (a) and (b) possess a substantially more viscous melt tube. Furthermore, the test rods injection molded from (a) and (b) also show a lower degree of attack with regard to tension corrosion in comparison with (c) and (d). In addition, test rods from (a) and (b) show a reduced inflammability in comparison with those from (c) and (d).

The products produced according to Examples 10 and 11 are outstandingly suitable for the production of large containers and flasks. Thus, an 18 liter container with a weight of about 1.3 kg. could be produced without difficulties.

EXAMPLE 12

Into a mixture of about 3,440 parts of 2,2-(4,4'-dihydroxydiphenyl)-propane about 88.5 parts of p-tert.-butylphenol, about 75,625 parts of (1.25 mol percent) trimeric isopropenylphenol, about 4,113 parts of 45% sodium hydroxide solution, about 17,500 parts of distilled water and about 33,130 parts of methylene chloride, there are added at temperatures of between about 24 and 25°

C. over a period of about two hours with stirring and in an atmosphere of nitrogen, about 1825 parts of phosgene. Approximately 6 parts of triethylamine are thereafter added. After stirring for an additional hour, the organic phase is separated off, washed several times with 2% sodium hydroxide solution, 2% phosphoric acid and distilled water and finally worked up by means of an evaporation extruder. The polycarbonate obtained has a viscosity of 1.316, the melt viscosity is 97,600 poises and the molecular weight, determined by light diffraction, is 57,300.

EXAMPLE 13

In a stainless steel 25 l. capacity, autoclave equipped with a stirrer, approximately 7,000 parts of 2,2-(4,4'-dihydroxy-diphenyl)propane, about 6,770 parts of diphenyl carbonate and about 0.01 part of a disodium salt of bisphenol are melted under a nitrogen atmosphere. Subsequently about 4,000 parts of phenol are distilled off, with agitation, at a pressure of about 100 mm. Hg while slowly increasing the melt temperature from 180 to 210° C. The pressure is then gradually reduced to about 2 mm. Hg and the temperature increased to 280° C.

An additional 1,700 parts of phenol is distilled. At this point, about 92.5 parts (0.75 mol percent) of trimeric isopropenylphenol are introduced into the melt and for about 30 minutes stirred at a pressure of about 50 mm. Hg. The pressure is subsequently reduced to about 0.3 mm. Hg and the polycondensation continued to the end at a melt temperature of between about 300 and 305° C. over a period of about 150 minutes.

A yellow colored melt is spun off from the autoclave as bristle and granulated. The polycarbonate has a relative viscosity of 1.320.

EXAMPLE 14

About 1825 parts of phosgene are introduced into a mixture of about 3440 parts of 2,2-(4,4'-dihydroxy-diphenyl)-propane, about 18 parts of 2,6-bis-(2'-hydroxy-5'-methyl-benzyl)-4-methyl-phenol, about 50 parts of p-tertiary-butylphenol, about 2813 parts of a 45% sodium hydroxide solution, about 17,500 parts of distilled water and about 33,130 parts of methylene chloride at about 24° to 25° C. in the course of about 2 hours while stirring in a nitrogen atmosphere. Simultaneously, from the 10th to the 90th minute, about 1300 parts of a 45% sodium hydroxide solution are added dropwise. After the introduction of phosgene is completed, about 6 parts of triethylamine are added. Stirring is continued for about one hour. The organic phase is washed, consecutively, with 2% phosphoric acid, 2% sodium hydroxide solution, twice more with 2% phosphoric acid and finally with distilled water until the solution is neutral. About 7500 parts of chlorobenzene are then added to the methylene chloride solution. The bulk of the methylene chloride is distilled off. After cooling, the polycarbonate gels and is comminuted to a powder/grain mixture in a granulating machine. The mixture is dried at about 120° C. for about 48 hours in a water jet vacuum. The relative viscosity of the polycarbonate is 1.38 (C=5 g./liter at 25° C. in methylene chloride). Under the conditions described in Examples 10 and 11, about 90 seconds are required to extrude the polycarbonate product into a 50 cm. long strand.

It is to be understood that any of the components and conditions mentioned as suitable herein can be substituted for its counterpart in the foregoing examples and that although the invention has been described in considerable detail in the foregoing, such detail is solely for the purpose of illustration. Variations can be made in the invention by those skilled in the art without departing from the spirit and scope of the invention except as is set forth in the claims.

What is claimed is:
1. A high molecular weight branched polycarbonate substantially free of crosslinking which comprises a polycarbonate polymer containing residues of an organic dihydroxy compound having up to ten carbon atoms, about 0.01 to about 2 mol percent of an organic trihydric or tetrahydric phenol and about 0.1 to about 8 mol percent of monohydric phenol, the mol percentages being based on the mols of the organic dihydroxy compound, said branched polycarbonate having a relative viscosity of from about 1.2 to about 1.55 measured on a solution of 0.5 gram in 100 ml. of methylene chloride at 25° C., an average molecular weight of between about 30,000 and about 100,000 measured by light diffraction and a melt viscosity of between about 20,000 and about 300,000 poises at 280° C.

2. The high molecular weight branched polycarbonate of claim 1 wherein the dihydroxy compound is a dihydric phenol.

3. The high molecular weight branched polycarbonate of claim 1 wherein the trihydric or tetrahydric phenol is trimeric isopropenylphenol.

4. The high molecular weight branched polycarbonate of claim 1 wherein the trihydric or tetrahydric phenol is 1,3,5-tri(4-hydroxyphenyl)benzene.

5. The high molecular weight branched polycarbonate of claim 1 wherein the trihydric or tetrahydric phenol is the reaction product of one or more alkyl, aryl or halogen substituted monophenols with formaldehyde or a formaldehyde yielding compound.

6. The high molecular weight branched polycarbonate of claim 1, wherein the polycarbonate polymer contains residues of an organic dihydroxy compound having up to ten carbon atoms, about 0.01 to about 2 mol percent of an organic trihydric or tetrahydric phenol and about 1 to about 6 mol percent of monohydric phenol.

7. A process for the preparation of a high molecular weight branched polycarbonate substantially free of crosslinking which comprises reacting a carbonic acid derivative with an organic dihydroxy compound containing up to about ten carbon atoms, from about 0.01 to about 2 mol percent of an organic trihydric or tetrahydric phenol and about 0.1 to about 8 mol percent of a monohydric phenol, the mol percentages being based on the mols of the organic dihydroxy compound.

8. The process of claim 7 wherein the trihydric or tetrahydric phenol is trimeric isopropenylphenol.

9. The process of claim 7 wherein the trihydric or tetrahydric phenol is the reaction product of an alkyl, aryl or halogen substituted monophenol with formaldehyde or a formaldehyde yielding compound.

10. The process of claim 7 wherein the carbonic acid derivative is phosgene or diphenyl carbonate.

11. Process of claim 7 wherein the organic dihydroxy compound is a dihydric phenol.

References Cited

UNITED STATES PATENTS

| 3,240,756 | 3/1966 | Deanin et al. | 260—47 |
| 3,275,674 | 9/1966 | Bottenbruch | 260—463 |

FOREIGN PATENTS

| 697,453 | 11/1964 | Canada | 260—47 |
| 885,442 | 12/1961 | Great Britain | 260—47 |

JOSEPH L. SCHOFER, Primary Examiner

C. A. HENDERSON, JR., Assistant Examiner

U.S. Cl. X.R.

161—192; 260—9, 37, 77.5, 618, 620, 873